United States Patent
Hanaoka

(10) Patent No.: US 10,071,920 B2
(45) Date of Patent: Sep. 11, 2018

(54) ELECTROLYZED WATER-MANUFACTURING APPARATUS AND ELECTROLYZED WATER-MANUFACTURING METHOD USING SAME

(71) Applicant: BIO-REDOX LABORATORY INC., Nagano (JP)

(72) Inventor: Kokichi Hanaoka, Nagano (JP)

(73) Assignee: BIO-REDOX LABORATORY, INC., Nagano (JP)

( * ) Notice: Subject to any disclaimer, the term of this patent is extended or adjusted under 35 U.S.C. 154(b) by 159 days.

(21) Appl. No.: 15/036,300

(22) PCT Filed: Feb. 28, 2015

(86) PCT No.: PCT/JP2015/056007
§ 371 (c)(1),
(2) Date: May 12, 2016

(87) PCT Pub. No.: WO2015/178063
PCT Pub. Date: Nov. 26, 2015

(65) Prior Publication Data
US 2017/0217799 A1    Aug. 3, 2017

(30) Foreign Application Priority Data
May 20, 2014    (JP) .................. 2014-103870

(51) Int. Cl.
*C02F 1/46*        (2006.01)
*C02F 1/461*       (2006.01)
(Continued)

(52) U.S. Cl.
CPC ............ *C02F 1/4618* (2013.01); *C02F 1/281* (2013.01); *C02F 1/283* (2013.01); *C02F 1/68* (2013.01);
(Continued)

(58) Field of Classification Search
None
See application file for complete search history.

(56) References Cited

U.S. PATENT DOCUMENTS

| 5,736,027 A | 4/1998 | Nakamura |
| 5,797,216 A | 8/1998 | Reznik |

(Continued)

FOREIGN PATENT DOCUMENTS

| JP | 1992-94787 A | 3/1992 |
| JP | 1995-24496 U | 5/1995 |

(Continued)

OTHER PUBLICATIONS

International Search Report dated Jun. 26, 2015, dated Jul. 9, 2015.
(Continued)

*Primary Examiner* — Arun S Phasge
(74) *Attorney, Agent, or Firm* — Norris McLaughlin & Marcus P.A.

(57) ABSTRACT

An electrolyzed water-manufacturing apparatus comprises: a flow-through-type electrolysis tank, having a pair of electrodes disposed parallel to each other, obtained by forming an anode chamber and a cathode chamber with a diaphragm stretched between the electrodes parallel therewith, and through which water flows through the anode chamber and the cathode chamber sequentially; a electrolysis starting water supply tube connected to the inlet of the anode chamber for supplying electrolysis starting water only to the anode chamber; an electrolyzed water extraction tube connected to the outlet of the cathode chamber for extracting the electrolyzed water; a circulation tube connecting the anode chamber outlet to the cathode chamber inlet; a free chlorine-removing filter disposed in the circulation tube; and a circulation tube formed downstream of the free chlorine-removing filter.

5 Claims, 7 Drawing Sheets

(51) Int. Cl.
*C02F 1/68* (2006.01)
*C02F 1/28* (2006.01)
*C02F 101/12* (2006.01)

(52) U.S. Cl.
CPC ............... *C02F 2001/46185* (2013.01); *C02F 2101/12* (2013.01); *C02F 2201/46115* (2013.01); *C02F 2201/46145* (2013.01)

(56) References Cited

U.S. PATENT DOCUMENTS

| | | | |
|---|---|---|---|
| 5,951,839 A | | 9/1999 | Reznik |
| 5,997,717 A | * | 12/1999 | Miyashita ............. C02F 1/4618 204/252 |
| 6,623,615 B1 | * | 9/2003 | Morisawa ............. C02F 1/4602 204/257 |

FOREIGN PATENT DOCUMENTS

| | | |
|---|---|---|
| JP | H9-502655 A | 3/1997 |
| JP | 1997-206751 A | 8/1997 |
| JP | 1997-220571 A | 8/1997 |
| JP | 10-235359 A | 9/1998 |
| JP | 1999-169856 A | 6/1999 |
| JP | 2000-33377 A | 2/2000 |
| JP | 2000-79391 A | 3/2000 |
| JP | 2002-18439 A | 1/2002 |
| JP | 2007-75730 A | 3/2007 |

OTHER PUBLICATIONS

English Translation of International Search Report dated Jun. 26, 2015, mailed Jul. 9, 2015.

* cited by examiner

ELECTROLYZED WATER-MANUFACTURING APPARATUS AND ELECTROLYZED WATER-MANUFACTURING METHOD USING SAME

This application is a 371 application of PCT/JP2015/056007 filed Feb. 28, 2015, which claims foreign priority benefits under 35 U.S.C. § 119 of Japanese Application Nos. 2014-103870, the disclosures of each of which are incorporated by reference herein in their entirety.

TECHNICAL FIELD

The present invention relates to an electrolyzed water-manufacturing apparatus having a diaphragm type electrolysis tank and an electrolyzed water-manufacturing method using the electrolyzed water-manufacturing apparatus. Specifically, the present invention relates to an electrolyzed water-manufacturing apparatus for electrolyzing electrolysis starting water (water before electrolysis) in one electrolysis chamber partitioned with a diaphragm and then further electrolyzing the water in the other electrolysis chamber by adding an additive, and an electrolyzed water-manufacturing method using the electrolyzed water-manufacturing apparatus.

BACKGROUND ART

In general, as an electrolyzed water-manufacturing apparatus, there are an apparatus having a diaphragm type electrolysis tank with a diaphragm between a pair of electrodes and an apparatus having a non-diaphragm type electrolysis tank without a diaphragm. These apparatuses are used according to an object.

For the diaphragm of the diaphragm type electrolysis tank, an ion-exchange membrane which is a charged membrane, a neutral membrane which is an uncharged membrane, or the like is used. Acidic electrolyzed water is generated on an anode side (anode chamber) of the diaphragm type electrolysis tank, and alkaline electrolyzed water is generated on a cathode side (cathode chamber). When an apparatus having a diaphragm type electrolysis tank is used, usually, water generated by electrolysis on an anode side (anode water) and water generated by electrolysis on a cathode side (cathode water) are extracted separately.

When electrolysis is performed by adding a chloride such as sodium chloride as an electrolyte to electrolysis starting water, hydrochloric acid, hypochlorous acid, dissolved oxygen, or Reactive Oxygen Species such as a hydroxyl radical, which is an electrode reaction product, is generated in anode water. Hypochlorous acid exhibits a strong chlorination reaction and oxidation reaction. Therefore, anode water is used for sterilization of fungi or the like.

On the other hand, cathode water generated on a cathode side is known widely as alkali ion water for drinking. A cathode water water-manufacturing apparatus (for example, refer to Patent Literatures 1 to 3) is commercially available as a medical equipment or the like, and is widespread with spread of mineral water.

Properties of the water generated by electrolysis can be expressed by some parameters. Examples of the parameter include a pH value, an oxidation-redox potential, a dissolved oxygen concentration, a dissolved hydrogen concentration, and a hypochlorous acid concentration. The values of these parameters are determined by the type and concentration of a solute contained in electrolysis starting water, the magnitude of an electrolytic energy imparted to electrolyzed water, and the like.

When water generated by electrolysis is used for drinking, the most important parameters are a hypochlorous acid concentration and a pH value. Cathode water does not contain hypochlorous acid, and therefore only the pH value should be considered. Strongly alkaline electrolyzed water or strongly acidic electrolyzed water is dangerous to a living body, and therefore electrolyzed water in a weakly alkaline to weakly acidic region is used for drinking. When the electrolytic energy is large, anode water shifts to a strongly acidic side, and cathode water shifts to a strongly alkaline side. Therefore, usually, an excessively large amount of electricity cannot be used at the time of electrolysis.

In order to maintain the pH of electrolyzed water obtained by using a large amount of electricity at the time of electrolysis within a predetermined range, various methods have been used conventionally. For example, a method for removing a harmful substance such as hypochlorous acid after obtaining mixed electrolyzed water by electrolysis with a non-diaphragm type electrolysis tank or by mixing anode water and cathode water obtained by electrolysis with a diaphragm type electrolysis tank; and a method for controlling the pH of cathode water by adding a pH adjuster before or after electrolysis with a diaphragm type electrolysis tank (refer to Patent Literature 4) are known. However, when electrolysis is performed by adding vitamin C or polyphenol to electrolysis starting water, an oxidation reaction in an anode chamber cannot be avoided disadvantageously.

CITATION LIST

Patent Literature

Patent Literature 1: JP 2002-18439 A
Patent Literature 2: JP 2000-33377 A
Patent Literature 3: JP 1999-169856 A
Patent Literature 4: JP 2000-79391 A

SUMMARY OF INVENTION

Technical Problem

An object of the present invention is to provide an electrolyzed water-manufacturing apparatus which can prevent oxidation of an additive when the additive is added to electrolysis starting water and can enhance an effect of the additive, and an electrolyzed water-manufacturing method using the electrolyzed water-manufacturing apparatus. Another object of the present invention is to provide a diaphragm type electrolyzed water-manufacturing apparatus in which electrolysis is further performed on a cathode side after electrolysis is performed on an anode side and an electrolytic energy on the anode side can be different from that on the cathode side, and an electrolyzed water-manufacturing method using the electrolyzed water-manufacturing apparatus.

Solution to Problem

The present inventors made intensive studies in order to solve the above problems. As a result, the present inventors have conceived that electrolysis starting water is electrolyzed in one of an anode chamber and a cathode chamber of a diaphragm type electrolysis tank, and then the water is electrolyzed in the other chamber by adding an additive. The present inventors have found that this method can enhance characteristics of an additive in comparison with a method of performing electrolysis sequentially in an anode chamber and a cathode chamber after adding an additive to electrolysis starting water, or a method of adding an additive after sequentially electrolyzing electrolysis starting water in an anode chamber and a cathode chamber. Therefore, the present inventors have completed the present invention by forming an electrolyzed water-manufacturing apparatus so as to be able to supply an additive after electrolysis in an anode chamber before electrolysis in a cathode chamber.

Furthermore, the present inventors have found that an amount of electricity in electrolysis per unit flow rate can be changed by changing a flow rate of water in an anode chamber or a cathode chamber by discharging a predetermined amount of electrolyzed water from a circulation tube connecting the anode chamber to the cathode chamber in a diaphragm type electrolysis tank in which water is made to flow in the anode chamber and the cathode chamber sequentially. Therefore, the present inventors have completed the present invention by forming an electrolyzed water-manufacturing apparatus so as to discharge a predetermined amount of water out of the apparatus after electrolysis in one electrolysis chamber before electrolysis in the other electrolysis chamber.

The present invention achieving the above object will be described below.

[1] An electrolyzed water-manufacturing apparatus includes:

a flow-through-type electrolysis tank provided with a pair of electrodes disposed parallel to each other, in which an anode chamber and a cathode chamber are formed by a diaphragm stretched between the electrodes parallel to the electrodes, and water is made to flow through the anode chamber and the cathode chamber sequentially;

an electrolysis starting water supply tube connected to an inlet of the anode chamber for supplying electrolysis starting water only to the anode chamber;

an electrolyzed water extraction tube connected to an outlet of the cathode chamber for extracting electrolyzed water in the cathode chamber out of the cathode chamber;

a circulation tube connecting an outlet of the anode chamber to an inlet of the cathode chamber;

a free chlorine-removing filter disposed in the circulation tube; and an additive-supplying port formed downstream of the free chlorine-removing filter in the circulation tube.

The electrolyzed water-manufacturing apparatus according to [1] above is illustrated in FIG. 1 below. The electrolyzed water-manufacturing apparatus according to [1] above is formed so as to be able to add an additive after electrolysis in the anode chamber before electrolysis in the cathode chamber.

[2] An electrolyzed water-manufacturing apparatus includes:

a flow-through-type electrolysis tank provided with a pair of electrodes disposed parallel to each other, in which an anode chamber and a cathode chamber are formed by a diaphragm stretched between the electrodes parallel to the electrodes, and water is made to flow through the anode chamber and the cathode chamber sequentially;

an electrolysis starting water supply tube connected to an inlet of the anode chamber for supplying electrolysis starting water only to the anode chamber;

an electrolyzed water extraction tube connected to an outlet of the cathode chamber for extracting electrolyzed water in the cathode chamber out of the cathode chamber;

a circulation tube connecting an outlet of the anode chamber to an inlet of the cathode chamber;

an anode water extraction tube connected to the circulation tube for extracting a part of the anode water; and a flow rate adjusting valve disposed in the anode water extraction tube for adjusting a flow rate of the anode water discharged out of the circulation tube.

The electrolyzed water-manufacturing apparatus according to [2] above is illustrated in FIG. 2 or 3 below. This electrolyzed water-manufacturing apparatus is formed so as to be able to reduce a flow rate of the anode water supplied to the cathode chamber by discharging a part of the anode water obtained by electrolysis in the anode chamber out of the apparatus.

[3] An electrolyzed water-manufacturing method using the electrolyzed water-manufacturing apparatus according to [1] includes:

obtaining anode water by performing electrolysis while electrolysis starting water is supplied from the electrolysis starting water supply tube only to the anode chamber;

removing free chlorine by making the anode water go through the free chlorine-removing filter;

obtaining additive-containing anode water by adding an additive from the additive-supplying port to the anode water; and performing electrolysis while the additive-containing anode water is supplied to the cathode chamber.

[4] The electrolyzed water-manufacturing method according to [3], in which the additive is water-soluble vitamin.

[5] The electrolyzed water-manufacturing method using the electrolyzed water-manufacturing apparatus according to [2] includes:

obtaining anode water by performing electrolysis while electrolysis starting water is supplied from the electrolysis starting water supply tube only to the anode chamber; and performing electrolysis while 5 to 95% by mass of the anode water is extracted from the anode water extraction tube and the remaining anode water is supplied only to the cathode chamber.

Advantageous Effects of Invention

In the electrolyzed water-manufacturing apparatus of the present invention, electrolysis starting water is electrolyzed in an anode chamber, and then the water can be further electrolyzed in a cathode chamber by adding an additive. Therefore, the electrolyzed water-manufacturing apparatus can prevent oxidation of the additive. In addition, the electrolyzed water-manufacturing apparatus can exhibit a higher effect of the additive by performing electrolysis after the additive is dissolved.

The electrolyzed water-manufacturing apparatus of the present invention can make an electrolytic energy in a cathode chamber higher than that in an anode chamber by electrolyzing electrolysis starting water in the anode chamber, then discharging a part thereof to reduce the flow rate, and supplying the water to the cathode chamber. As a result, the electrolyzed water-manufacturing apparatus can manufacture electrolyzed water having a physical property value not obtainable by using a conventional apparatus.

DESCRIPTION OF EMBODIMENTS (1) Structure of Apparatus

Figure 1:
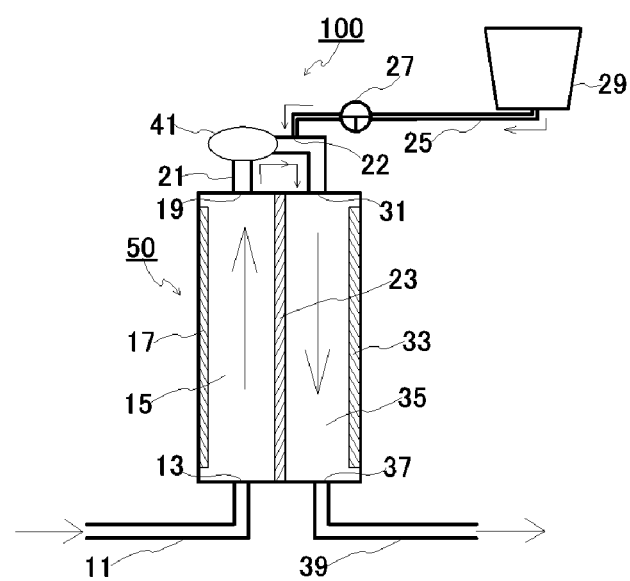
FIG. 1 is a schematic structural view illustrating an example of the electrolyzed water-manufacturing apparatus of the present invention.

First, a structure of an electrolyzed water-manufacturing apparatus of the present invention (hereinafter, also referred to as "the present apparatus") will be described. FIG. 1 is a schematic structural view illustrating an exemplary structure of the present apparatus.

In FIG. 1, the reference sign 100 represents an electrolyzed water-manufacturing apparatus, and the reference sign 50 represents an electrolysis tank. Each of electrodes 17 and 33 is disposed parallel to each other along one side wall in the hollow box-like electrolysis tank 50. Each of the electrodes 17 and 33 is connected to a power source (not illustrated) with wiring.

The reference sign 23 represents a diaphragm disposed between the electrodes 17 and 33 parallel to the electrodes 17 and 33. An inner space of the electrolysis tank 50 is divided in a liquid-tight manner by the diaphragm 23. A space on a side of the electrode 17 of the electrolysis tank 50, divided by the diaphragm 23, constitutes an anode chamber 15, and a space on a side of the electrode 33 constitutes a cathode chamber 35.

One end of an electrolysis starting water supply tube 11 is connected to a side of an inlet 13 of the anode chamber 15. The other end of the electrolysis starting water supply tube 11 is connected to an electrolysis starting water supply source (faucet or water tank) (not illustrated). One end of a circulation tube 21 is connected to a side of an outlet 19 of the anode chamber 15. The other end of the circulation tube 21 is connected to a side of an inlet 31 of the cathode chamber 35. An electrolyzed water extraction tube 39 is connected to a side of an outlet 37 of the cathode chamber 35.

An additive-supplying port 22 is formed in the circulation tube 21. One end of an additive-supplying tube 25 is connected to the additive-supplying port 22. The other end of the additive-supplying tube 25 is connected to an additive-supplying tank 29. An opening and closing valve 27 is disposed in the additive-supplying tube 25.

A free chlorine-removing filter 41 is disposed in the circulation tube 21. This makes it possible to add an additive after removing free chlorine generated in the anode chamber. A known filter using activated carbon, zeolite, or the like as an adsorbent can be used as the free chlorine-removing filter.

The present apparatus 100 has such a structure that electrolysis starting water supplied from the electrolysis starting water supply tube 11 into the anode chamber 15 flows from the anode chamber 15 to the cathode chamber 35 though the circulation tube 21, and subsequently is extracted from the electrolyzed water extraction tube 39 out of the apparatus. In addition, the present apparatus 100 has such a structure that an additive can be added from the additive-supplying tank 29 through an additive-supplying port formed in the circulation tube 21.

The electrodes 17 and 33 are formed of electrochemically inactive metal plates. Preferable examples of the metal material include platinum and a platinum alloy. The thickness of each of the electrodes 17 and 33 is preferably from 0.1 to 2.0 mm, and particularly preferably from 0.5 to 1.5 mm. The gap between the electrodes 17 and 33 is preferably from 3.0 to 1.0 mm, and particularly preferably from 2.0 to 1.0 mm. The polarity of the electrode can be preferably switched freely by a control unit (not illustrated). That is, preferably, any one of the electrodes 17 and 33 can be an anode, and the other can be a cathode. By switching the polarity of the electrode appropriately, adhesion of scale or the like generated by electrolysis starting water to the electrode can be suppressed, and a life of the electrode can be extended.

As the diaphragm 23, a conventionally used electrolysis diaphragm such as an ion-exchange membrane or an uncharged membrane can be used appropriately. For example, an uncharged membrane (trade name: GORE-TEX SGT-010-135-1) manufactured by Japan Gore-Tex Inc. can be used.

In FIG. 1, a three-way valve is used as the opening and closing valve 27. However, the opening and closing valve 27 is not limited thereto, and any valve can be used as long as the valve can adjust a flow path or a flow rate freely, such as a ball valve or a float valve.

A feed pump may be disposed in the additive-supplying tube 25. In addition, a check valve may be disposed in the additive-supplying tube 25 in order to prevent electrolysis starting water from flowing in an opposite direction to the arrow in FIG. 1.

(2) Operation of the Present Apparatus

Next, a method for manufacturing electrolyzed water using the electrolyzed water-manufacturing apparatus 100 illustrated in FIG. 1 will be described. The arrow in FIG. 1 indicates a direction of water flow in the apparatus.

The electrolysis starting water supplied from one end of the electrolysis starting water supply tube 11 is supplied from the side of the inlet 13 of the first electrolysis (anode) chamber 15 into the anode chamber 15 through the electrolysis starting water supply tube 11, The electrolysis starting water is electrolyzed by a DC voltage current applied to the electrodes 17 and 33 (electrolyzed water obtained by electrolysis here is also referred to as "anode water"). Thereafter, the anode water is sent from the side of the outlet 19 of the anode chamber 15 to the circulation tube 21.

When an additive is not added to the anode water, the opening and closing valve 27 is closed, and the anode water is sent to the cathode chamber 35 as it is. On the other hand, when an additive is added to the anode water, the opening and closing valve 27 is opened, and the additive is added. The additive goes through the additive-supplying tube 25 from the additive-supplying tank 29 and is supplied from the additive-supplying port 22 into the additive-supplying tube 21.

Thereafter, the anode water is supplied from the side of the inlet 31 of the cathode chamber 35 into the cathode chamber 35. The anode water is further electrolyzed here (electrolyzed water obtained by electrolysis here is also referred to as "cathode water"). Subsequently, the cathode water is extracted out of the apparatus from the side of the outlet 37 of the cathode chamber 35 through the electrolyzed water extraction tube 39.

In the electrolyzed water-manufacturing apparatus of the present invention, electrolysis starting water is electrolyzed in an anode chamber, and then the water can be further electrolyzed together with an additive in a cathode chamber by adding the additive. The electrolysis in this manner can prevent oxidation of the additive by electrolysis on an anode side (anode chamber). Furthermore, the activity of the additive can be enhanced by further electrolyzing the water together with the additive after addition of the additive.

A case in which L-ascorbic acid is added as the additive will be described below. In the following description, the skeleton part of L-ascorbic acid is abbreviated as AsA. L-ascorbic acid including enediol groups at a 2-position and a 3-position is abbreviated as HO-AsA-OH. O=AsA=O indicates dehydroascorbic acid.

An electrode reaction between L-ascorbic acid and water at the anode is indicated as follows. L-ascorbic acid reacts at the anode as indicated in formulae (1) to (4) below to generate dehydroascorbic acid.

[Chemical formula 1]

  (1)

  (2)

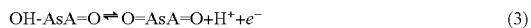  (3)

  (4)

That is, L-ascorbic acid is oxidized by the electrode reaction at the anode to generate dehydroascorbic acid. Therefore, the radical scavenging ability of L-ascorbic acid disappears.

On the other hand, L-ascorbic acid reacts at the cathode as indicated in formulae (5) and (6) below.

[Chemical formula 2]

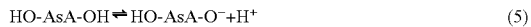  (5)

  (6)

At the cathode, L-ascorbic acid is not oxidized, but acts as an electron donor for a free radical due to a reducing atmosphere, and can make a free radical such as DPPH (1,1-diphenyl-2-picrylhydrazyl) disappear.

The value of a current applied to the electrolysis starting water is preferably from 0.5 A to 10 A, and particularly preferably from 1 A to 5 A with respect to the electrolysis starting water having a flow rate of 1 L/min. When the value is less than 0.5 A, the amount of dissolved oxygen or the amount of dissolved hydrogen in the electrolyzed water cannot be higher than that in the electrolysis starting water. When the value is more than 10 A, a large amount of current flows, and therefore fatigue of the electrode is increased and an electrolysis efficiency tends to be reduced extremely.

The flow rate of the electrolysis starting water supplied to the electrolysis tank 50 is preferably from 0.5 to 10 L/min, and particularly preferably from 1 to 5 L/min.

Examples of the additive include water-soluble vitamin such as L-ascorbic acid or vitamin B, various minerals, and various polyphenols. When the electrolyzed water-manufacturing apparatus of the present invention is used, the dissolving power of water is increased, and therefore the solubility can be improved by adding a water-sparingly soluble additive. Various gases can be further added as the additive. When gas is added, a gas cylinder is connected in place of the additive-supplying tank 29.

In the present apparatus 100, the electrolysis starting water is supplied by connecting one end of the electrolysis starting water supply tube 11 to a faucet. In this case, tap water in the present apparatus and electrolyzed water obtained by electrolyzing this tap water are transferred by a water pressure of the tap water.

The ionic strength of a water-soluble inorganic salt or the like in the electrolysis starting water as a total of water-soluble inorganic electrolytes is preferably 0.1 mM or more, and particularly preferably from 0.1 to 0.5 mM. An electrolyte may be added to the electrolysis starting water. Examples of the electrolyte include sodium chloride.

Figure 2:
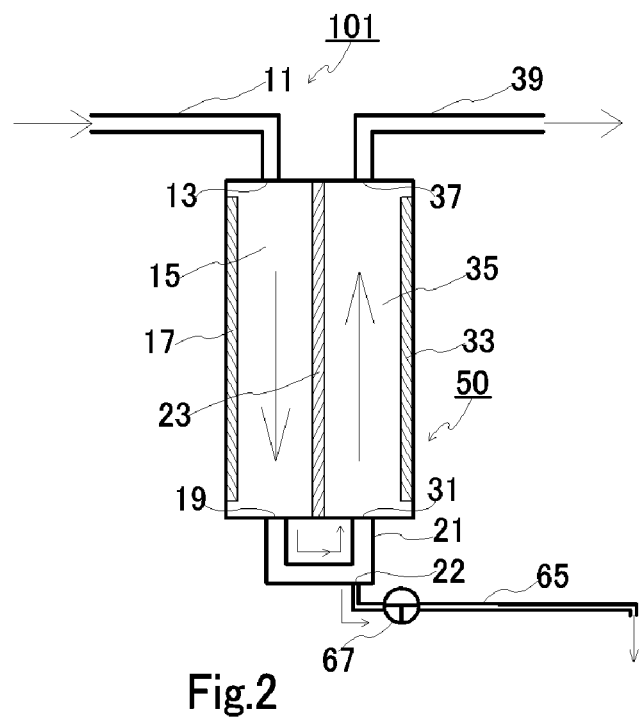
FIG. 2 is a schematic structural view illustrating another example of the electrolyzed water-manufacturing apparatus of the present invention.

FIG. 2 is a structural view illustrating another example of the electrolyzed water-manufacturing apparatus of the present invention. An anode water extraction tube 65 is connected to the additive-supplying port 22 in the apparatus in FIG. 1 in place of the additive-supplying tube 25. A flow rate adjusting valve 67 is disposed in the anode water extraction tube 65. The same reference sign is given to the same structure as in FIG. 1, and description thereof will be omitted.

When this apparatus is used, a part of the anode water obtained by electrolysis in the anode chamber can be sent to a side of the anode water extraction tube 65 to be discharged. As a result, the flow rate of the anode water sent to the cathode chamber can be reduced. This can make the amount of electricity in electrolysis in the cathode chamber larger than that in the anode chamber. As a result, a physical property value of the resulting electrolyzed water can be changed more largely than a case in which a conventional apparatus is used.

Figure 3:
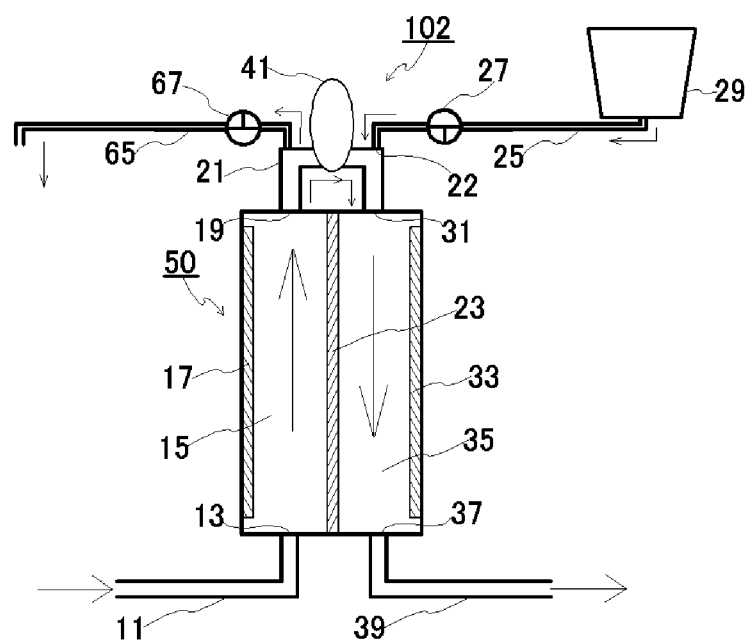
FIG. 3 is a schematic structural view illustrating still another example of the electrolyzed water-manufacturing apparatus of the present invention.

FIG. 3 is a structural view illustrating still another example of the electrolyzed water-manufacturing apparatus of the present invention. The anode water extraction tube 65 is connected to the circulation tube 21 in the apparatus in FIG. 1 in addition to the additive-supplying tube 25. The flow rate adjusting valve 67 is disposed in the anode water extraction tube 65.

When this apparatus is used, a part of the anode water obtained by electrolysis in the anode chamber can be sent to a side of the anode water extraction tube 65 to be discharged. An additive can be further added to this anode water. As a result, the flow rate of the anode water sent to the cathode chamber can be reduced, and the additive can be added. This can make the amount of electricity in electrolysis in the cathode chamber larger than that in the anode chamber. As a result, a physical property value of the resulting electrolyzed water can be changed more largely than a case in which a conventional apparatus is used, and the activity of the additive can be enhanced.

When electrolyzed water-manufacturing apparatuses 101 and 102 are used, a ratio between a flow rate of anode water discharged from the circulation tube 21 outside and a flow rate of the anode water sent to a side of the cathode chamber is preferably from 1:19 to 19:1, and more preferably from 1:10 to 10:1.

Tap water includes chlorine in a form of Cl$^-$, HCl, Cl$_2$, OCl$^-$, or the like. This chlorine generates hypochlorous acid by electrolysis. Hypochlorous acid exhibits a sterilization action. When this anode water is used for sterilization, the anode water can be used by extracting the anode water from the anode water extraction tube 65.

Figure 4:
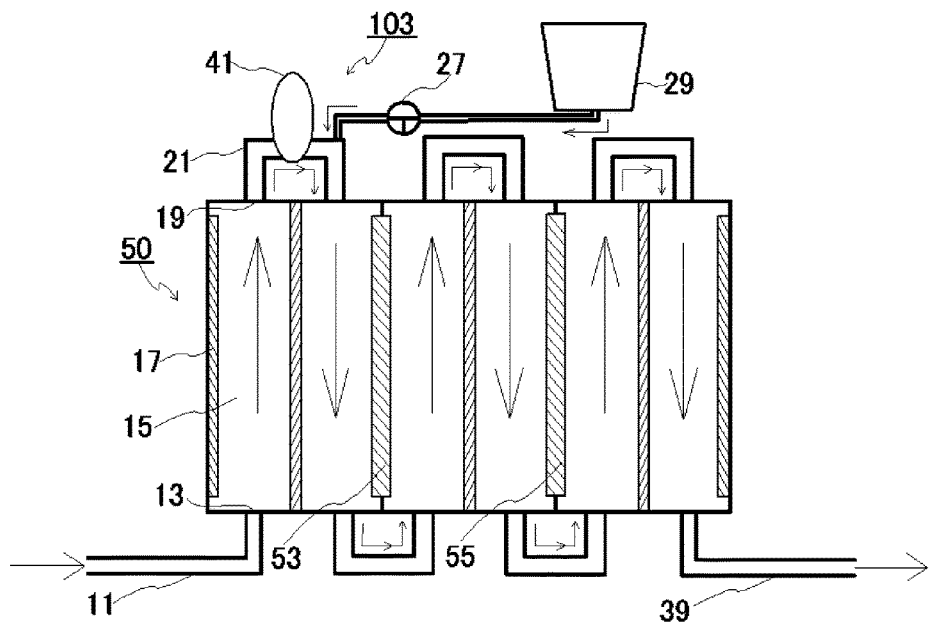
FIG. 4 is a schematic structural view illustrating still another example of the electrolyzed water-manufacturing apparatus of the present invention.

The present apparatus may be provided with a plurality of electrolysis tanks 50. FIG. 4 illustrates an electrolyzed water-manufacturing apparatus provided with a plurality of electrolysis tanks. In this apparatus 103, the electrolysis tanks 50 are connected in series. This makes it possible to electrolyze electrolysis starting water a plurality of times and to increase the applied amount of electricity in electrolysis. In addition, this apparatus can reduce the number of electrode plates compared with the conventional number. Conventionally, each electrolysis tank requires two electrode plates, and an electrolyzed water-manufacturing apparatus having n electrolysis tanks requires (2n) electrode plates. The present apparatus requires at least (n+1) electrode plates because an anode plate and/or a cathode plate constituting one electrolysis tank are/is used also for an electrode plate constituting another electrolysis tank. Therefore, manufacturing cost of an apparatus can be reduced.

EXAMPLES

Hereinafter, the present invention will be described more specifically with reference to Examples and Comparative Examples.

[Method for Measuring DPPH Scavenging Ability]

A radical scavenging ability of a DPPH (1,1-diphenyl-2-picrylhydrazyl) free radical by L-ascorbic acid was measured with an electron spin resonance spectrometer. An electron spin resonance spectrometer ES-10 manufactured by NIKKISO Co., Ltd. was used as the electron spin resonance spectrometer. 100 μL of a 200 μM DPPH ethanol solution and 100 μL of a sample solution diluted 100 times with pure water were mixed and stirred, and the DPPH radical scavenging ability was measured with the electron spin resonance spectrometer.

Figure 5:
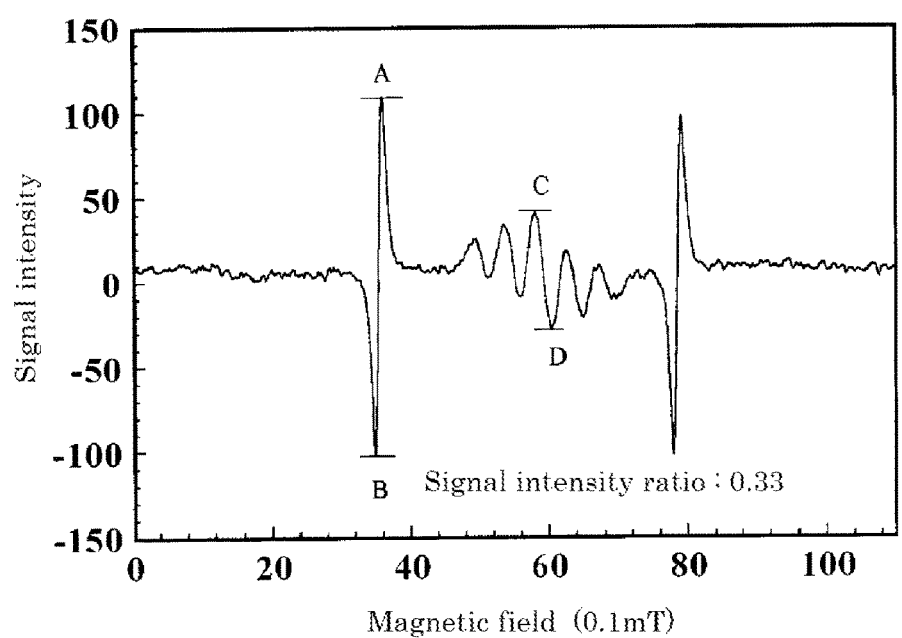
FIG. 5 illustrates a spectrum indicating a DPPH radical scavenging ability of pure water only.

FIG. 5 illustrates a result of measurement with the electron spin resonance spectrometer when only pure water was used in order to determine a standard value. As illustrated in FIG. 5, a signal intensity ratio between the AB signal intensity and the CD signal intensity is 0.33. The signal intensity ratio of 0.33 or more means that DPPH free radicals hardly disappear.

Example 1

The electrolyzed water-manufacturing apparatus illustrated in FIG. 1 was formed. The inner space of the electrolysis tank had a rectangular shape having a size of 15 cm×10 cm×0.3 cm. A platinum electrode formed into a plate shape having a size of 140 mm×100 mm was used as an electrode. A distance between the electrodes was 2 mm. Tap water including a small amount of electrolyte was used as electrolysis starting water. An additive-supplying tank was filled with a 2 mM L-ascorbic acid aqueous solution. Using the electrolyzed water-manufacturing apparatus having this structure, electrolyzed water was manufactured at a flow rate of the electrolysis starting water of 2 L/min., a supplying rate of the L-ascorbic acid aqueous solution from the additive-supplying tube of 100 ml/min., and an applied current of 2 A.

Figure 6:
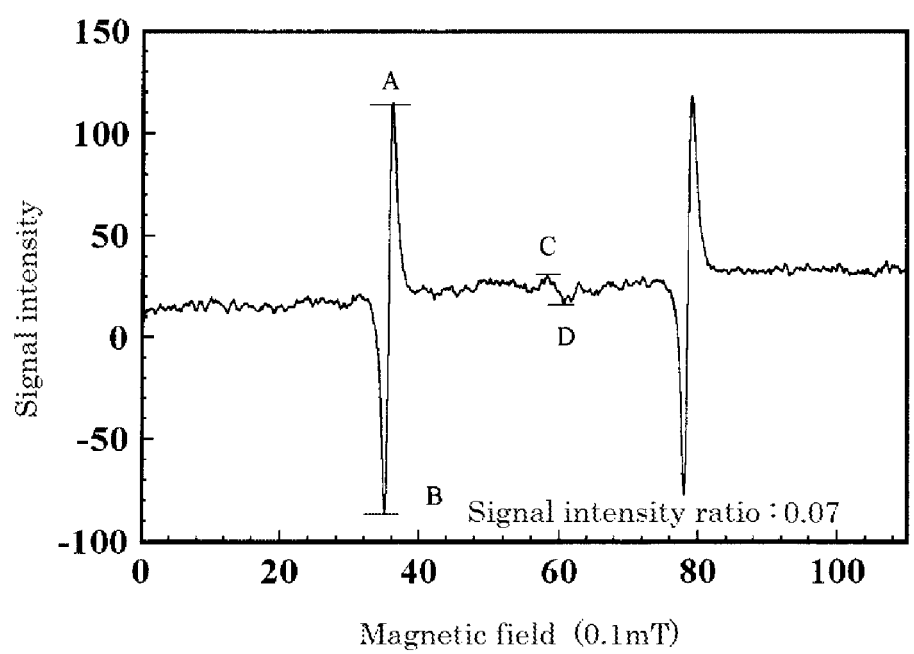
FIG. 6 illustrates a spectrum indicating a DPPH radical scavenging ability of electrolyzed water in Example 1.

The DPPH free radical scavenging ability was measured using this electrolyzed water as a sample. The results are illustrated in FIG. 6. The signal intensity ratio had a very small value 0.07, and the DPPH free radical scavenging ability was large. That is, this indicates that dehydroascorbic acid was not generated because L-ascorbic acid was not electrolyzed in the anode chamber and the DPPH free radical scavenging ability was large.

Comparative Example 1

L-ascorbic acid having the same concentration as the electrolyzed water obtained in Example 1 was added to electrolysis starting water in advance, and electrolyzed water was manufactured similarly using the same apparatus as in Example 1. L-ascorbic acid was not added from the additive-supplying port of the circulation tube.

Figure 7:
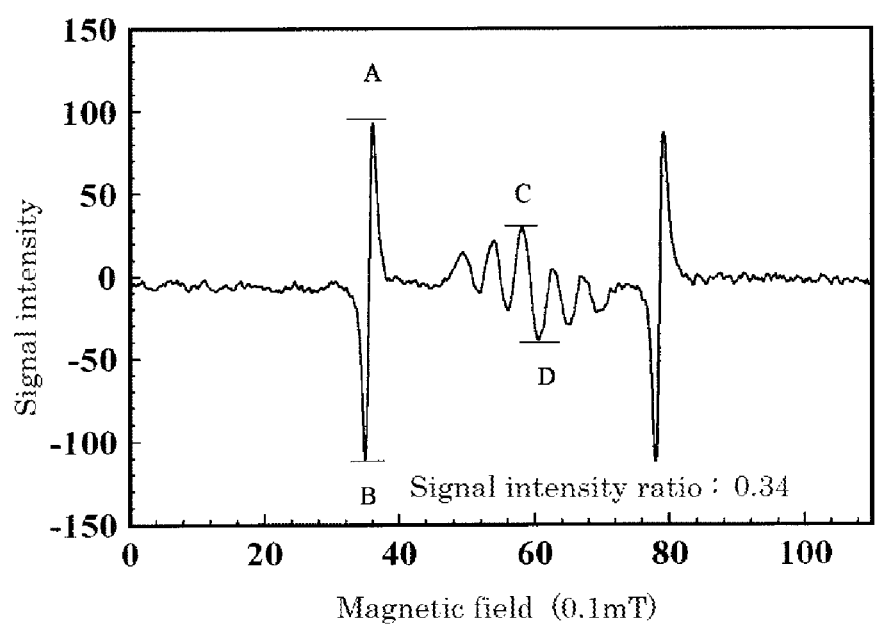
FIG. 7 illustrates a spectrum indicating a DPPH radical scavenging ability of electrolyzed water in Comparative Example 1.

The DPPH free radical scavenging ability was measured using this electrolyzed water as a sample. The results are illustrated in FIG. 7. The signal intensity ratio was 0.34, almost the same as in a case of only pure water. That is, this indicates that dehydroascorbic acid was generated because L-ascorbic acid was electrolyzed in the anode chamber and the DPPH free radical scavenging ability did not appear.

Comparative Example 2

Electrolyzed water was manufactured similarly using the same electrolysis starting water and apparatus as in Example 1. L-ascorbic acid was not added from the additive-supplying port of the circulation tube. L-ascorbic acid having the same concentration as the electrolyzed water obtained in Example 1 was added to the resulting electrolyzed water to obtain a sample.

Figure 8:
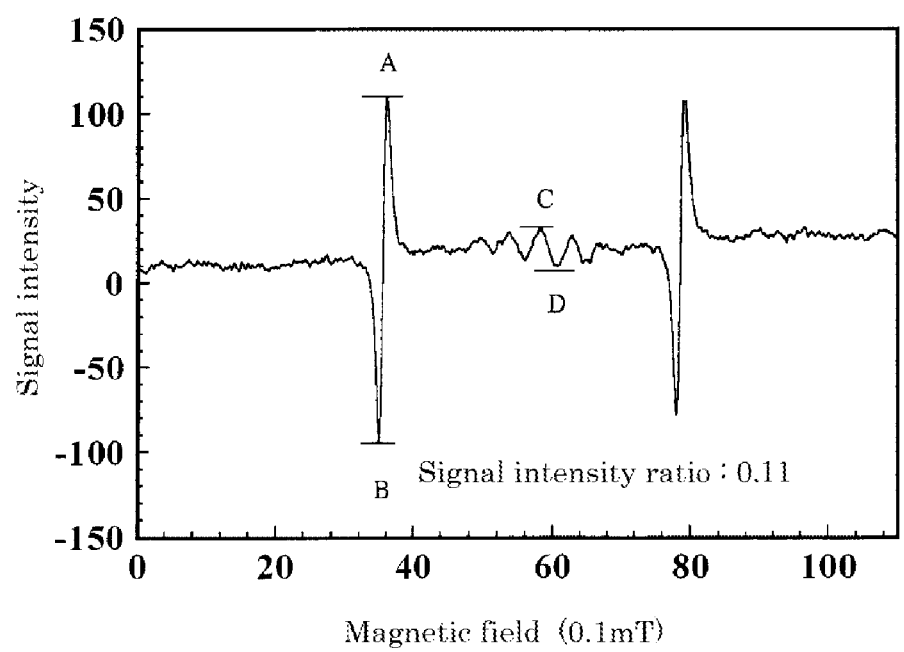
FIG. 8 illustrates a spectrum indicating a DPPH radical scavenging ability of electrolyzed water in Comparative Example 2.

The DPPH free radical scavenging ability was measured using this water as a sample. The results are illustrated in FIG. 8. The signal intensity ratio was 0.11, and the DPPH free radical scavenging ability was large. That is, this indicates that dehydroascorbic acid was not generated because L-ascorbic acid was not electrolyzed in the anode chamber and the DPPH free radical scavenging ability was large. However, Example 1 exhibited a stronger DPPH free radical scavenging ability. Example 1 is different from Comparative Example 2 in that the anode water in which L-ascorbic acid is dissolved is electrolyzed in the cathode chamber in Example 1 but L-ascorbic acid is added to the electrolyzed water after electrolysis in Comparative Example 2. It is considered that L-ascorbic acid is dissociated more because L-ascorbic acid is electrolyzed together with a solvent in the cathode chamber, and that as a result, the activity of L-ascorbic acid is enhanced.

Example 2

Electrolyzed water was manufactured similarly using the same electrolysis starting water and apparatus as in Example 1. Physicochemical parameters of this electrolyzed water at 25° C. were measured. A dissociation exponent of water pKw was determined using a formula improved by Davis ("Ionic Equilibrium", page 45, written by James N. Butter, issued by John Willy & Sons, Inc.). The results are illustrated in Table 1. In Table 1, ORP indicates an oxidation-reduction potential value of a comparative electrode. DO, DH, EC, and FC indicate a dissolved oxygen concentration, a dissolved hydrogen concentration, an electric conductivity, and a free chlorine concentration, respectively.

Comparative Example 3

The same electrolysis starting water as in Example 1 was added to the additive tank using the electrolyzed water generating apparatus used in Example 1, and was supplied into the electrolysis tank to manufacture electrolyzed water.

Physicochemical parameters of the electrolyzed water extracted from a cathode side were measured. The results are illustrated in Table 1 below.

TABLE 1

|  | pH | ORP (mV) | DO (ppm) | DH (ppm) | EC (mS/m) | FC (ppm) | pKw |
|---|---|---|---|---|---|---|---|
| Example 2 | 7.86 | −292 | 14.4 | 0.312 | 20 | 0 | 13.19 |
| Comparative Example 3 | 9.80 | −141 | 7.5 | 0.17 | 19 | 0.15 | 13.88 |

When the same flow rate and the same applied current were used, supersaturated dissolved oxygen was generated in Example 2. In Example 2, dissolved hydrogen having a higher concentration than in Comparative Example 3 was generated. A smaller pKw value of electrolyzed water indicates a larger ionic product of water and a higher activity of water as a solvent. That is, as the pKw value is smaller, a solute is dissolved more and the reactivity of the solute is higher. The electrolyzed water in Example 2, electrolyzed at the anode and the cathode, had a larger ionic product of water than the electrolyzed water in Comparative Example 3, electrolyzed only at the cathode. For reference, pure water not electrolyzed had an ionic product of 14.0.

Comparative Example 4

L-ascorbic acid having the same concentration as the electrolyzed water obtained in Example 1 was added to pure water, and the DPPH free radical scavenging ability was measured. L-ascorbic acid having the same concentration as the electrolyzed water obtained in Example 1 was added to commercially available alkali ion water, and the DPPH free radical scavenging ability was measured. When the signal intensity ratio of pure water was assumed to be 1.0, the signal intensity ratio of alkali ion water was 0.98, and the signal intensity ratio of the electrolyzed water manufactured in Example 1 was 0.60.

REFERENCE SIGNS LIST 100, 101, 102, 103 electrolyzed water-manufacturing apparatus
11 electrolysis starting water supply tube
13 inlet of anode chamber
15 anode chamber
17, 33 electrode
19 outlet of anode chamber
21 circulation tube
22 additive-supplying port
23 diaphragm
25 additive-supplying tube
27 opening and closing valve
29 additive tank
31 inlet of cathode chamber
35 cathode chamber
37 outlet of cathode chamber
39 electrolyzed water extraction tube
41 free chlorine-removing filter
50 electrolysis tank
65 anode water extraction tube
67 flow rate adjusting valve

The invention claimed is:
1. An electrolyzed water-manufacturing apparatus comprising:
   a flow-through-type electrolysis tank provided with a pair of electrodes disposed parallel to each other, in which an anode chamber and a cathode chamber are formed by a diaphragm stretched between the electrodes parallel to the electrodes, and water is made to flow through the anode chamber and the cathode chamber sequentially;
   an electrolysis starting water supply tube connected to an inlet of the anode chamber, configured to supply electrolysis starting water only to the anode chamber;
   an electrolyzed water extraction tube connected to an outlet of the cathode chamber, configured to extract electrolyzed water in the cathode chamber out of the cathode chamber;
   a circulation tube configured to connect an outlet of the anode chamber to an inlet of the cathode chamber;
   a free chlorine-removing filter disposed in the circulation tube; and
   an additive-supplying port formed downstream of the free chlorine-removing filter in the circulation tube.
2. An electrolyzed water-manufacturing method using the electrolyzed water-manufacturing apparatus according to claim 1, comprising:
   obtaining anode water by performing electrolysis while electrolysis starting water is supplied from the electrolysis starting water supply tube only to the anode chamber;
   removing free chlorine by making the anode water go through the free chlorine-removing filter;
   obtaining additive-containing anode water by adding an additive from the additive-supplying port to the anode water; and
   performing electrolysis while the additive-containing anode water is supplied to the cathode chamber.
3. The electrolyzed water-manufacturing method according to claim 2, wherein the additive is water-soluble vitamin.
4. An electrolyzed water-manufacturing apparatus comprising:
   a flow-through-type electrolysis tank provided with a pair of electrodes disposed parallel to each other, in which an anode chamber and a cathode chamber are formed by a diaphragm stretched between the electrodes parallel to the electrodes, and water is made to flow through the anode chamber and the cathode chamber sequentially;
   an electrolysis starting water supply tube connected to an inlet of the anode chamber, configured to supply electrolysis starting water only to the anode chamber;
   an electrolyzed water extraction tube connected to an outlet of the cathode chamber, configured to extract electrolyzed water in the cathode chamber out of the cathode chamber;
   a circulation tube configured to connect an outlet of the anode chamber to an inlet of the cathode chamber;
   an anode water extraction tube connected to the circulation tube, configured to extract a part of the anode water; and
   a flow rate adjusting valve disposed in the anode water extraction tube, configured to adjust a flow rate of the anode water discharged out of the circulation tube.
5. The electrolyzed water-manufacturing method using the electrolyzed water-manufacturing apparatus according to claim 4, comprising:
   obtaining anode water by performing electrolysis while electrolysis starting water is supplied from the electrolysis starting water supply tube only to the anode chamber; and performing electrolysis while 5 to 95% by mass of the anode water is extracted from the anode water extraction tube and the remaining anode water is supplied only to the cathode chamber.

* * * * *